(12) United States Patent
Army et al.

(10) Patent No.: US 10,710,160 B2
(45) Date of Patent: Jul. 14, 2020

(54) SHROUDED ROTOR AND A HYBRID ADDITIVE MANUFACTURING PROCESS FOR A SHROUDED ROTOR

(71) Applicant: Hamilton Sundstrand Corporation, Charlotte, NC (US)

(72) Inventors: Donald E. Army, Enfield, CT (US); Diana Giulietti, Weatogue, CT (US); Alexander Madinger, Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 111 days.

(21) Appl. No.: 15/864,599

(22) Filed: Jan. 8, 2018

(65) Prior Publication Data

US 2019/0210111 A1    Jul. 11, 2019

(51) Int. Cl.
*B23K 26/342*        (2014.01)
*B22F 3/24*          (2006.01)
(Continued)

(52) U.S. Cl.
CPC ............... *B22F 3/24* (2013.01); *B22F 5/009* (2013.01); *B23P 15/006* (2013.01); *B33Y 10/00* (2014.12);
(Continued)

(58) Field of Classification Search
CPC .. B22F 3/24; B22F 2998/10; B22F 2003/247; B22F 5/009; F04D 29/284;
(Continued)

(56) References Cited

U.S. PATENT DOCUMENTS 3,405,913 A * 10/1968 Chatfield ................. F16J 15/42
                                              415/174.5
5,342,171 A     8/1994 Stanko
(Continued)

FOREIGN PATENT DOCUMENTS

CN      106077643 A    11/2016
EP        3251787 A1   12/2017
(Continued)

OTHER PUBLICATIONS

Extended European Search Report for EP Application No. 19150567. 6, dated May 23, 2019, pp. 10.

*Primary Examiner* — Jun S Yoo
(74) *Attorney, Agent, or Firm* — Kinney & Lange, P.A.

(57) ABSTRACT

A hybrid additive manufacturing process is utilized for creating a shrouded rotor with the shrouded rotor having a hub at a radial center, a shroud at a radial outer side, and vanes extending therebetween. The hybrid additive manufacturing process includes forming the shrouded rotor in stages, with a first stage being formed by depositing material in an axial direction through a first stage of the hub, machining an outer surface of the first stage of the hub to smooth the outer surface, depositing material on the first stage of the hub in a radial direction through a first stage of the vanes and the shroud, and machining all surfaces of the first stage of the vanes and an inner surface of the first stage of the shroud to smooth the surfaces. Subsequent stages of the shrouded rotor are formed similarly to the first stage.

16 Claims, 4 Drawing Sheets

(51) Int. Cl.
    *B33Y 10/00*     (2015.01)
    *B23P 15/00*     (2006.01)
    *F01D 5/04*     (2006.01)
    *F04D 29/02*     (2006.01)
    *B22F 5/00*     (2006.01)
    *F04D 29/22*     (2006.01)
    *F04D 29/28*     (2006.01)
    *B33Y 40/00*     (2020.01)
    *B33Y 80/00*     (2015.01)
    *F04D 29/16*     (2006.01)
    *B64D 13/06*     (2006.01)

(52) U.S. Cl.
    CPC ............... *B33Y 40/00* (2014.12); *B33Y 80/00* (2014.12); *F01D 5/048* (2013.01); *F04D 29/023* (2013.01); *F04D 29/026* (2013.01); *F04D 29/162* (2013.01); *F04D 29/2222* (2013.01); *F04D 29/281* (2013.01); *F04D 29/284* (2013.01); *B22F 2003/247* (2013.01); *B22F 2998/10* (2013.01); *B64D 13/06* (2013.01); *F05D 2230/00* (2013.01); *F05D 2250/193* (2013.01); *F05D 2250/29* (2013.01); *F05D 2300/6032* (2013.01)

(58) Field of Classification Search
    CPC .. F04D 29/2222; F04D 29/026; F04D 29/023; F04D 29/281; F04D 29/162; F01D 5/048; B23P 15/006; B33Y 80/00; B33Y 40/00; B33Y 10/00; F05D 2250/193; F05D 2300/6032; F05D 2230/00; F05D 2250/29; B64D 13/06
    See application file for complete search history.

(56) References Cited

U.S. PATENT DOCUMENTS

| | | |
|---|---|---|
| 9,174,426 B1 | 11/2015 | Dowd |
| 2009/0110556 A1 | 4/2009 | Jahnz et al. |
| 2014/0169971 A1 | 6/2014 | Vedula et al. |
| 2015/0017001 A1 | 1/2015 | Ahn |
| 2015/0044048 A1 | 2/2015 | Ahn |
| 2015/0196971 A1 | 7/2015 | Schneider et al. |
| 2015/0267543 A1* | 9/2015 | Gerber ................... B22F 5/009 416/212 R |
| 2016/0010469 A1 | 1/2016 | Guo |
| 2017/0341178 A1* | 11/2017 | Rettberg ............... B23P 15/006 |
| 2018/0370861 A1* | 12/2018 | Gold ................... C04B 38/0625 |
| 2019/0105735 A1* | 4/2019 | Brunhuber ......... B23K 26/0006 |

FOREIGN PATENT DOCUMENTS

| | | |
|---|---|---|
| WO | WO2016127225 A1 | 8/2016 |
| WO | WO2017/096440 A1 | 6/2017 |

\* cited by examiner

SHROUDED ROTOR AND A HYBRID ADDITIVE MANUFACTURING PROCESS FOR A SHROUDED ROTOR

BACKGROUND

The present disclosure relates to the manufacture of a shrouded rotor and, in particular, to a hybrid additive manufacturing process utilized in the manufacture of a shrouded rotor.

Rotating airfoils, such as rotors of an air cycle machine (hereinafter "ACM") on an aircraft, lose efficiency due to the need to have clearance between the rotor tips and a nonrotating shroud radially outward from the rotors. To increase efficiency, the shroud can be fastened to the rotors so as to rotate with the rotors and a hub radially inward from the rotors. Prior art processes utilized to create this shrouded rotor fasten the shroud to the rotors through brazing, welding, bolts and nuts, rivets, or other fasteners. Other prior art methods utilize a process that constructs the shrouded rotor such that space within the shrouded rotor is limited and prevents the access of tools to machine (i.e., smooth) the flow surfaces adjacent the flow path within the shrouded rotor.

SUMMARY

A hybrid additive manufacturing process is utilized for creating a shrouded rotor with the shrouded rotor having a hub at a radial center, a shroud at a radial outer side, and vanes extending therebetween. The hybrid additive manufacturing process includes forming the shrouded rotor in stages, with a first stage being formed by depositing material in an axial direction through a first stage of the hub, machining an outer surface of the first stage of the hub to smooth the outer surface, depositing material on the first stage of the hub in a radial direction through a first stage of the vanes and the shroud, and machining all functional surfaces of the first stage of the vanes and an inner surface of the first stage of the shroud to smooth the surfaces. A second stage of the shrouded rotor is formed by depositing material on the first stage of the hub in the axial direction through a second stage of the hub, machining an outer surface of the second stage of the hub to smooth the outer surface, depositing material on the second stage of the hub in the radial direction through a second stage of the vanes and the shroud, and machining all functional surfaces of the second stage of the vanes and an inner surface of the second stage of the shroud to smooth the surfaces. The hybrid manufacturing process can form the shrouded rotor through any number of stages similar to the process of forming the first stage and/or the second stage.

A shrouded rotor includes a hub at a radial center having an outer surface forming an inner wall of a flow path, a shroud at a radial outer side having an inner surface forming an outer wall of the flow path, and vanes extending within the flow path between the hub and the shroud with the outer surface of the hub, the inner surface of the shroud, and all surfaces of the vanes having a surface roughness of less than $32R_a$ (also referred to as "roughness average" with this parameter/measurement being known to someone of skill in the art).

DETAILED DESCRIPTION

Figure 1A:
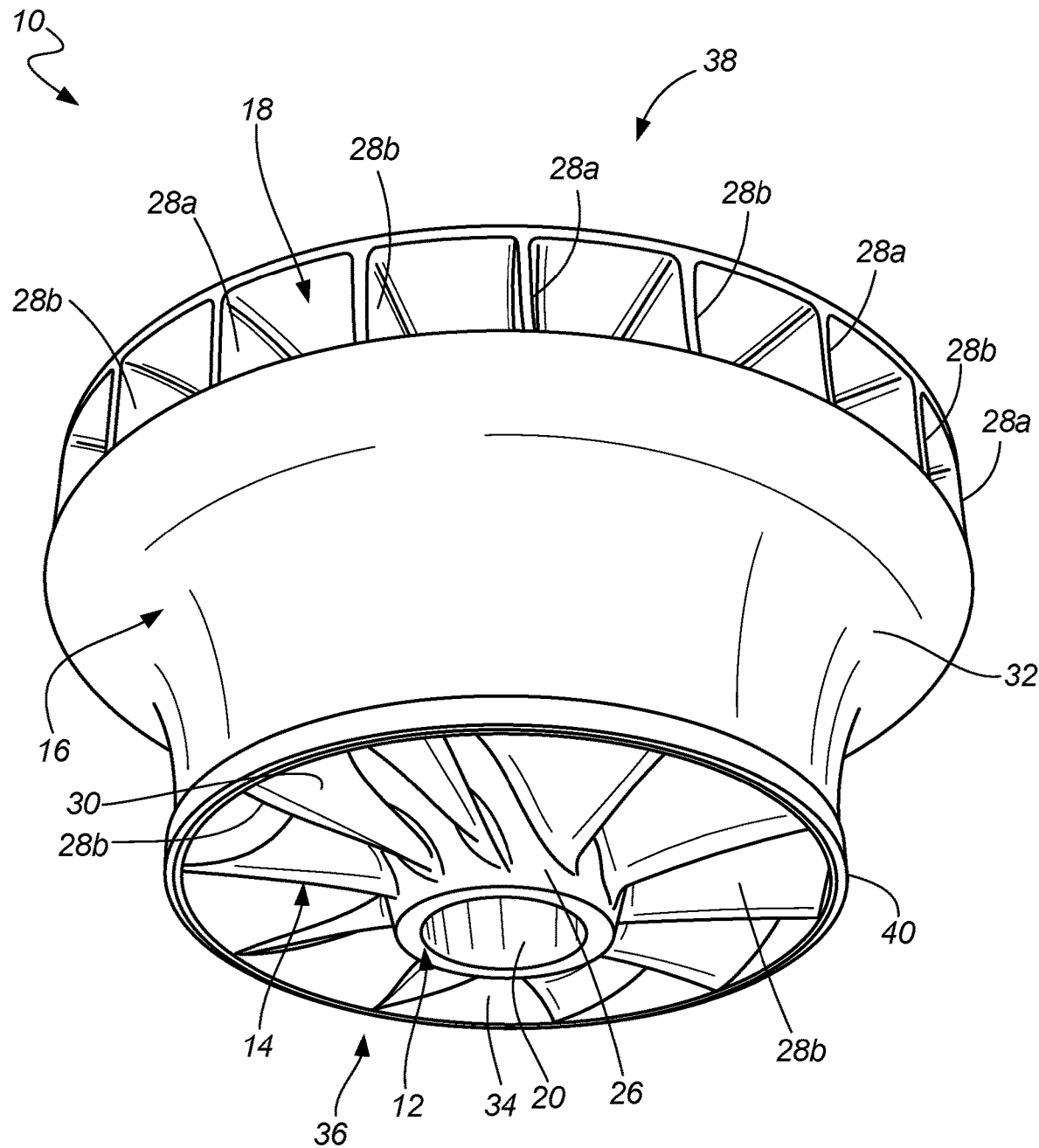
FIG. 1A is a perspective view of an ACM shrouded rotor.

A hybrid manufacturing process for creating a shrouded rotor is disclosed herein that includes forming the shrouded rotor in a number of stages to ensure that machining tools have sufficient clearance to machine/smooth the flow surfaces adjacent the flow path within the shrouded rotor. The hybrid manufacturing process includes forming each stage before proceeding on to forming a subsequent stage of the shrouded rotor. Forming a first stage (and most subsequent stages) includes depositing material in an axial direction through a first stage/portion of the hub at a radial center, machining a radially outer surface (i.e., a flow surface) of the first stage of the hub to smooth the outer surface, depositing material on the first stage of the hub in a radial direction through a first stage of vanes (i.e., rotors) and a shroud, and machining all surfaces of the first stage of the vanes and an inner surface of the first stage of the shroud (i.e., flow surfaces) to smooth the surfaces. Because the flow surfaces are machined/smoothed after the first stage of the hub is formed (and then after the first stage of the vanes and shroud are formed), the machining tools are easily able to access the flow surfaces to machine/smooth those surfaces, which would not be possible if the entire shrouded rotor was additively manufactured all in one step/stage. After the first stage is formed, the second stage is formed through a similar process building upon the first stage of the hub, vanes, and shroud. A subsequent stage (or multiple subsequent stages) can utilize at least one insert that is placed into at least one void within the soon-to-be-created flow path to provide support to the soon-to-be-created vanes and the soon-to-be-created shroud. After depositing material to create that stage's vanes and shroud, the at least one insert is removed through machining, chemically, or through other means. Forming each stage of the shrouded rotor can include additional steps, such as rotating the partially created shrouded rotor before depositing material to create that stage's vanes and shroud, rotating the partially created shroud rotor back before depositing material to create a subsequent stage's hub, and depositing material on an outer surface of the shroud to create a labyrinth seal. The hybrid additive manufacturing process can include other steps as set out in the description below.

As stated above, the hybrid additive manufacturing process constructs the shrouded rotor in stages that allow for machining/smoothing tools to access the flow surfaces adjacent the flow path within the shrouded rotor. With the hybrid additive manufacturing process allowing for the flow surfaces to be machined/smoothed, the efficiency of the resulting shrouded rotor is increased because of the smoothness of the flow surfaces. Because the vanes/rotors of the shrouded rotor are supported at both ends (i.e., supported at a radially inner end by the hub and at a radially outer end by the shroud), the vanes can have a reduced thickness, which also increases efficiency by reducing the mass of the shrouded rotor and by requiring a less robust containment structure that is needed to prevent damage if/when the vanes/rotors become detached from the hub. With the shroud being integral with the vanes and hub, the manufacturing process is simplified because a separate shroud does not need to be fastened to the vanes and hub through brazing, welding or other means. Further, because the shroud in integral with the vanes and hub, the vanes and hub do not need to be axially shimmed to adjust the clearance between the rotating vanes and hub and the nonrotating shroud, thus further simplifying the manufacturing process.

This disclosure will first describe the structure of the ACM shrouded rotor and then describe the hybrid additive manufacturing process utilized in construction of the ACM shrouded rotor. While this disclosure describes the hybrid additive manufacturing process with regards to an ACM shrouded rotor, the process can be utilized with the construction of other components that require machining/smoothing.

Figure 1B:
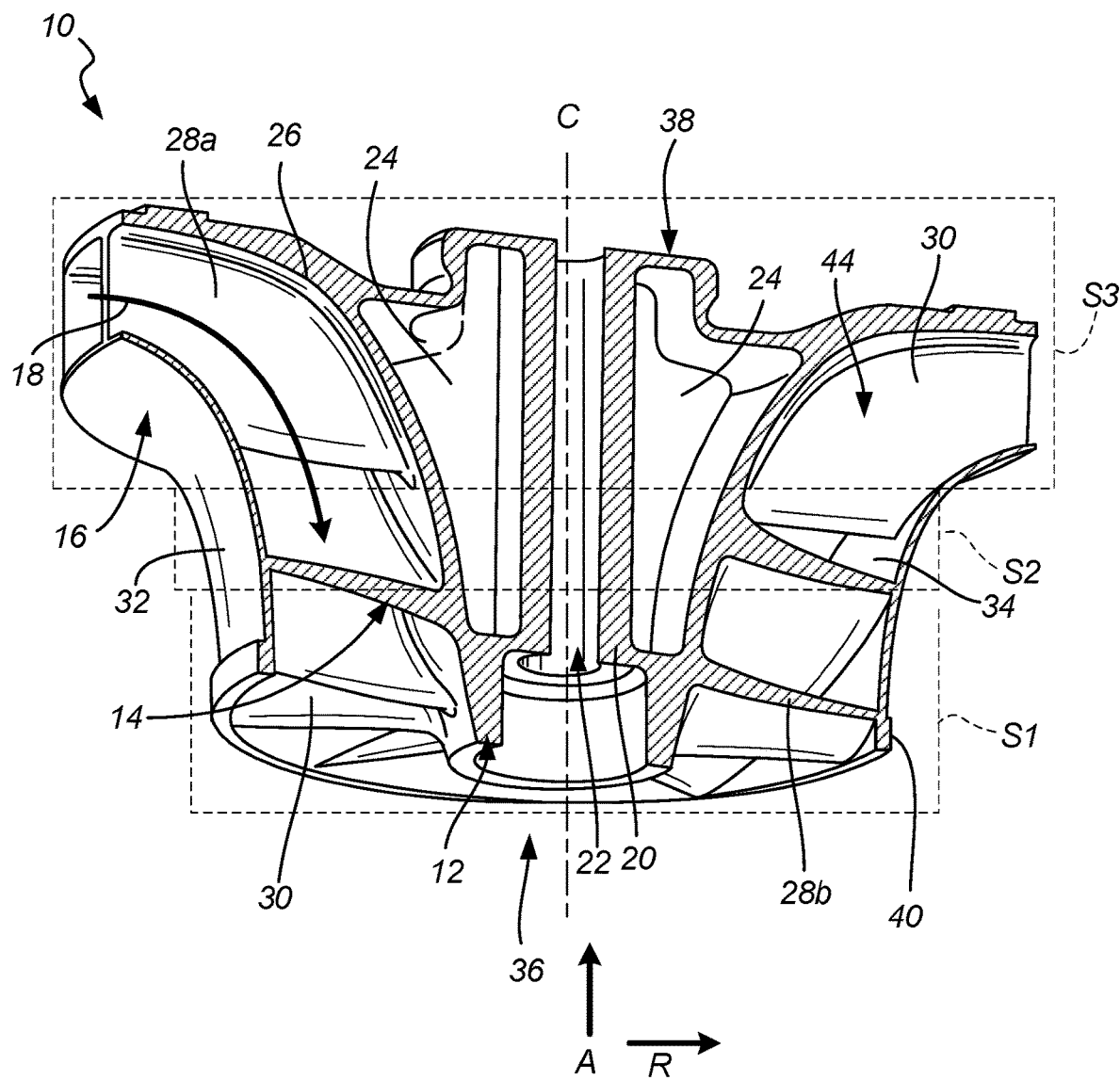
FIG. 1B is a cross-sectional view of the ACM shrouded rotor.
Figure 1C:
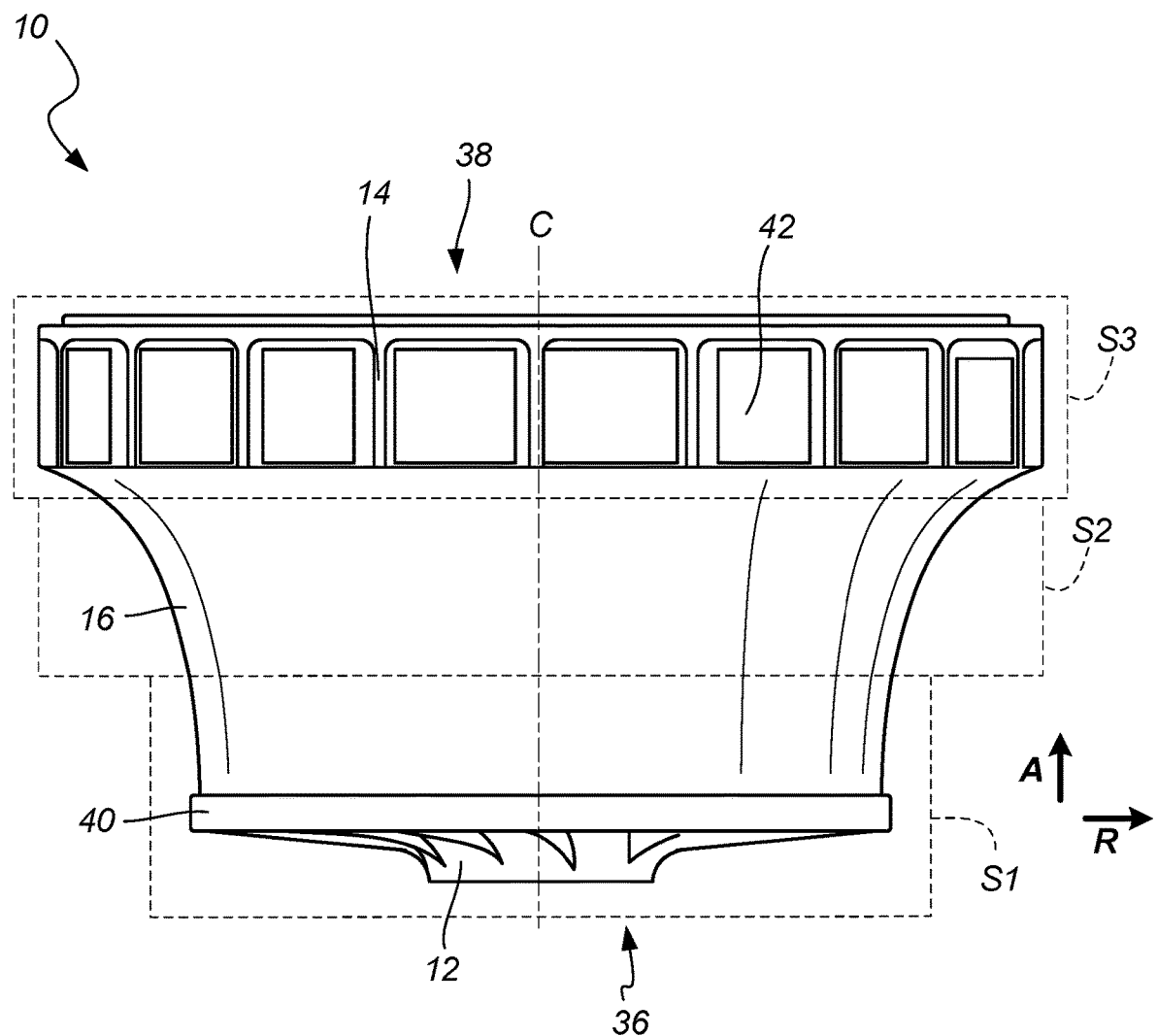
FIG. 1C is a perspective view of the ACM shrouded rotor with inserts in place.

FIG. 1A is a perspective view of an ACM shrouded rotor, FIG. 1B is a cross-sectional view of the ACM shrouded rotor, and FIG. 1C is a perspective view of the ACM shrouded rotor with inserts in place. Shrouded rotor 10 includes hub 12, vanes (also referred to as rotors) 14, shroud 16, and flow path 18. Hub 12 includes bore 20 at radial center 22, ribs 24, and outer surface 26. Vanes 14 include partial vanes 28a, full vanes 28b, and surfaces 30. Shroud 16 includes radial outer side 32 and inner surface 34. Shrouded rotor 10 also includes first axial end 36, second axial end 38, and labyrinth seal 40. Inserts 42 that can be located within voids 44 in flow path 18 during manufacture of shrouded rotor 10. Also shown is axial build direction A, radial build direction R, first stage S1, second stage S2, and third stage S3 of shrouded rotor 10 with first stage S1, second stage S2, and third stage S3 dividing shrouded rotor 10 into "slices" (i.e., discrete portions).

Shrouded rotor 10 is a rotating component (about centerline C) within an ACM that provides flow path 18 through which air that is conditioned flows to eventually be provided to a fuselage of an aircraft. Shrouded rotor 10 can be radially outward from and centered about a shaft (which extends through bore 20 of hub 12) that extends along centerline C. Shrouded rotor 10 is shown as having a substantially frustoconical shape with flow path 18 providing a path for air to enter at an inlet adjacent second axial end 38 by flowing radially inward, change direction while flowing through flow path 18 formed within shrouded rotor 10, and exit flow path 18 at an outlet adjacent first axial end 36 by flowing in an axial direction parallel to centerline C. While shrouded rotor 10 is shown as being substantially frustoconical, shrouded rotor 10 can have other configurations, such as a cylindrical configuration in which flow path 18 is parallel to centerline C. Shrouded rotor 10 can be constructed from a variety of materials, such as steel and/or titanium alloys or aluminum silicone alloys, but the material should be suitable to be used in an additive manufacturing process while also being able to be machined to provide a smooth surface to the flow surfaces of flow path 18.

Hub 12 is annular in shape extending axially along centerline C. Hub 12 is centered about centerline C at radial center 22. Hub 12 includes bore 20 at radial center 22 that provides an aperture through which a shaft of the ACM can extend. Hub 12 also includes outer surface 26 forming the radially outward most part of hub 12, with outer surface 26 being a flow surface that forms the innermost surface of flow path 18. During manufacture of shrouded rotor 10, outer surface 26 of hub 12 is machined to a surface roughness of less than $32R_a$ to provide less drag on the air flowing through flow path 18. In this disclosure, the surface roughness of various surfaces, including outer surface 26 of hub 12, is measured using the roughness average, $R_a$, which is the arithmetic average of the absolute values of the profile height deviations from the mean line that is recorded within the evaluation length. While the roughness average parameter/measurement is used, other parameters/measurements can be utilized to determine the roughness of the surfaces of interest of shrouded rotor 10.

Extending axially within hub 12 can be ribs 24, which are radially extending internal support structures. Hub 12 can have one or multiple ribs 24 circumferentially spaced within hub 12. Ribs 24 can decrease a thickness of walls that form hub 12 because ribs 24 provide additional support to shrouded rotor 10. Hub 12 can be frustoconical (as shown in the disclosed embodiment) with first axial end 36 having a cross section with a smaller diameter than a diameter of a cross section at second axial end 38. Thus, the diameter of hub 12 formed during first stage S1 can be smaller than a diameter of a cross section of hub 12 formed doing second stage S2. During construction of shrouded rotor 10, first stage S1 will be adjacent first axial end 36 with first stage S1 of hub 12 being constructed in axial build direction A. At second axial end 38, hub 12 extends radially outward to form the axial side of shrouded rotor 10. Hub 12 can have other features and configurations to provide support to flow path 18 and shrouded rotor 10.

Vanes 14 are outward from hub 12 and extend between the hub 12 and shroud 16. Vanes 14 are substantially radially outward from hub 12, but near second axial end 38 vanes 14 are axially forward of hub 12 (with forward being a direction downward in FIGS. 1A-1C) due to the changing direction of flow path 18. Vanes 14 can also be classified as rotors because vanes 16 rotate along with the other components of shrouded rotor 10. Vanes 16 include two configurations of vanes: partial vanes 28a and full vanes 28b. Partial vanes 28a extend only a portion of a length of flow path 18, beginning at the inlet adjacent second axial end 38 and extending along flow path 18 towards first axial end 36 but not extending the entire length of flow path 18 to first axial end 36. Full vanes 28b extend the entire length of flow path 18, beginning at the inlet adjacent second axial end 38 and ending at the outlet at first axial end 36. Both partial vanes 28a and full vanes 28b can be angled and/or bowed (or have other features) such that the vanes extend at least partially in a circumferential direction. As is known to someone of ordinary skill in the art, partial vanes 28a and full vanes 28b can have a variety of configurations to guide the flow of air through flow path 18. Additionally, other configurations of vanes 14 do not have to include partial vanes 28a and/or full vanes 28b. Vanes 14 includes surface 30, which are exposed to air flowing through flow path 30. During manufacture of shrouded rotor 10, surfaces 30 of vanes 14 are machined to a surface roughness of less than $32R_a$ to provide less drag on the air flowing through flow path 18. With vanes 14 being supported at both radial ends by hub 12 and shroud 16, vanes can be thinner (i.e., have a thin wall) than if supported only at one end.

Shroud 16 is annular in shape and the radially outermost component of shrouded rotor 10. Shroud 16 includes radial outer side 32 on the radially outermost side and inner surface 34 forming the radially outer boundary/wall of flow path 18. Shroud 16 extends axially from first axial side 36 to the inlet of flow path 18 such that shroud 16 does not extend an entire axial length of shrouded rotor 10. Shroud 16 can have a frustoconical shape that is similar to the shape of outer surface 26 of hub 12 with a diameter of shroud 16 adjacent first axial end 36 being smaller than a diameter of shroud 16 adjacent the inlet of flow path 18 closer to second axial end 38. Radial outer side 32 can include other features that interact with structures radially outward from shroud 16, such as labyrinth seal 40.

Labyrinth seal 40 is a radially outward extending seal located on radial outer side 32 of shroud 16 adjacent first axial end 36. Labyrinth seal 40 seals a gap radially outward from shroud 16 between shrouded rotor 10 and structures outward from shrouded rotor 10. During manufacture of shrouded rotor 10, labyrinth seal 40 can be constructed in conjunction with shroud 16 such that the two are one continuous component (i.e., labyrinth seal 40 can be one continuous component with shrouded rotor 10). While this disclosure describes the seal as being labyrinth seal 40, other embodiments can include other types of seals.

Inner surface 34 of shroud 16 is a flow surface that forms the outermost surface of flow path 18. During manufacture of shrouded rotor 10, inner surface 34 of shroud 16 is machined to a surface roughness of $32R_a$ (also referred to as "roughness average" with this parameter/measurement being known to someone of skill in the art) to provide less drag on the air flowing through flow path 18. Shroud 16 is one of the last components to be constructed during manufacture of each stage of shrouded rotor 10.

As shown in FIG. 1C, inserts 42 can be located within voids 44 (shown in FIG. 1B) of flow path 18 at the inlet of flow path 18 near second axial end 38 of shrouded rotor 10. Inserts 42 are blocks that can have any shape and/or configuration to fit within voids 44 during manufacture of vanes 14 and shroud 16. During manufacture of shrouded rotor 10, inserts 42 can be placed within voids 44 to support soon-to-be-created vanes 14 and shroud 16. Support for shroud 16 may be necessary during construction (i.e., depositing of material) of shroud 16 due to shroud 16 having a large overhang at a location near the inlet of flow path 18. As will be described with regards to FIG. 2, inserts 42 can be inserted into voids 44 during manufacture of shrouded rotor 10 during construction of one of the final stages of vanes 14 and shroud 16 (with a later stage being referred to as an Nth stage). After the corresponding vanes 14 and shroud 16 are constructed and have hardened such that no support is needed, inserts 42 are removed from voids 44 so that flow path 18 is unobstructed. Inserts 42 can be constructed from a variety of materials that allow for inserts 42 to be easily removed from voids 44, such as a material that is machined away (i.e., inserts 42 are ground, drilled, or otherwise removed using a machine) or a material that can be removed through chemical means (i.e., a chemical is used to dissolve inserts 42 while not dissolving or otherwise affecting shrouded rotor 10). Thus, insert 42 can be constructed from a different material than the material that makes up the components of shrouded rotor 10 (i.e., hub 12, vanes 14, and shroud 16).

Shrouded rotor 10 is manufactured in multiple stages, with first stage S1, second stage S2, and third stage S3 being set out in FIG. 1B. While FIG. 1B shows the entirety of shrouded rotor 10 being divided into three stages, the manufacture of shrouded rotor 10 can be performed in any number of stages. Thus, when describing the hybrid additive manufacturing process in FIG. 2, stages after first stage S1 and second stage S2 are denoted as being the Nth stage with hub 12, vanes 14, and shroud 16 in those stages being constructed very similarly to the construction of hub 12, vanes 14, and shroud 16 of second stage S2 (other than the placement and removal of inserts 42).

When describing first stage S1, second stage S2, and third stage S3, each stage represents the portion of hub 12, vanes 14, and shroud 16 (as set out in FIG. 1B) constructed during that particular manufacturing subprocess/stage. Thus, for example, during first stage S1, a portion of hub 12, vanes 14, and shroud 16 closest to first axial end 36 is constructed. Then, during second stage S2, a portion of hub 12, vanes 14, and shroud 16 adjacent the first stage S1 is constructed. Finally, because shrouded rotor 10 is shown as being manufactured in three stages, during third stage S3, a final portion of hub 12, vanes 14, and shroud 16 closest to second axial end 38 is constructed. If more stages were utilized during the hybrid additive manufacturing process to construct shrouded rotor 10, a smaller axial portion of hub 12, vanes 14, and shroud 16 would be constructed during each of the stages (thus dividing shrouded rotor 10 into thinner axial "slices"). This hybrid additive manufacturing process is described in FIG. 2.

Figure 2:
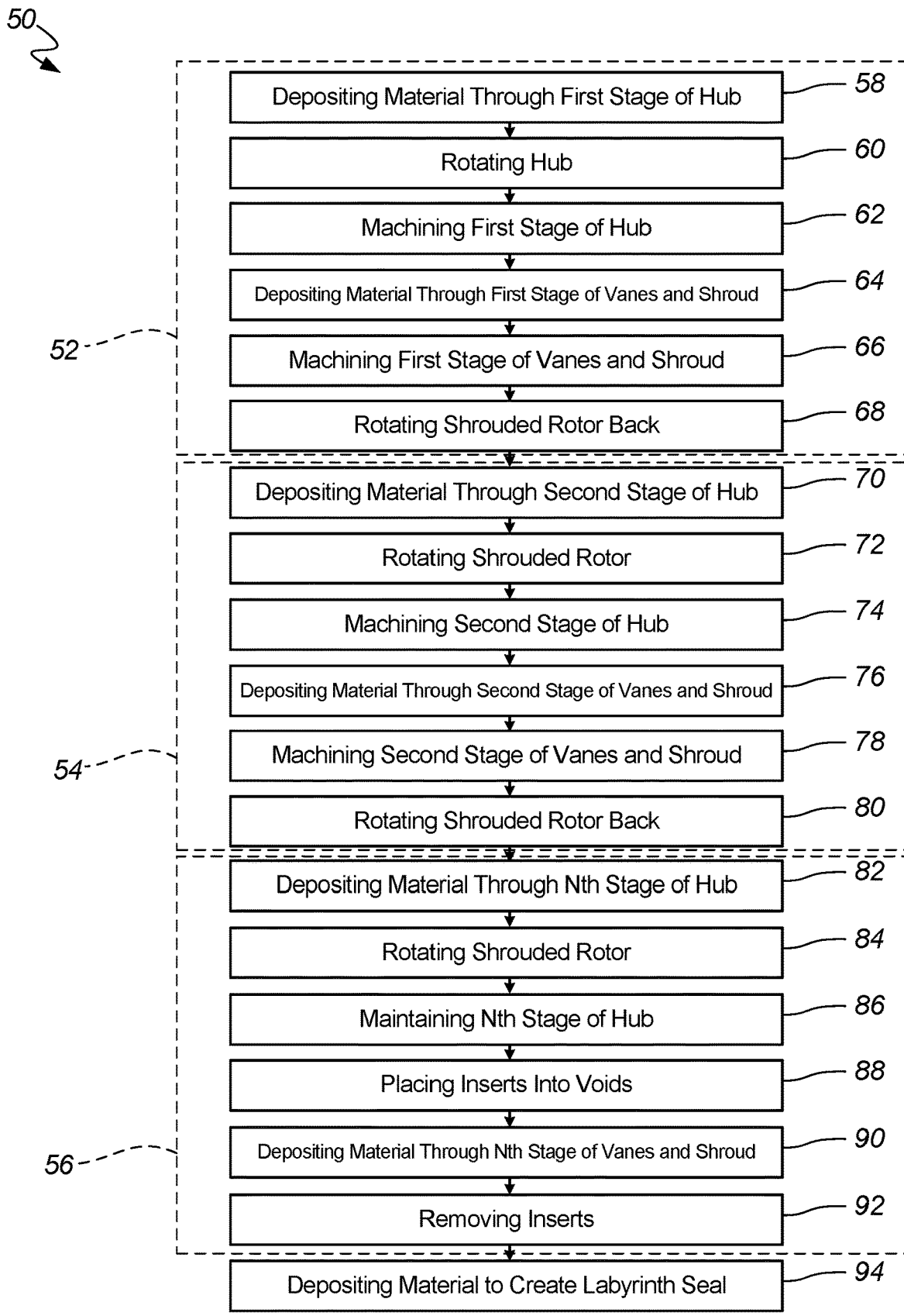
FIG. 2 is a flow diagram of a hybrid additive manufacturing process.

FIG. 2 is a flow diagram of hybrid additive manufacturing process 50. The steps of hybrid additive manufacturing process 50 will be described in conjunction with FIG. 1B and the stages outlined therein. Hybrid additive manufacturing process 50 is divided into multiple stages, each of which includes multiple manufacturing steps. Hybrid manufacturing process 50 includes forming the first stage S2, forming the second stage S4, and forming the Nth stage S6 (which can be third stage S3 or another later stage if the process includes more than three stages). Forming first stage S2 includes depositing material through the first stage of the hub 58, rotating the hub 60, machining the first stage of the hub 62, depositing material through the first stage of the vanes and shroud 64, machining the first stage of the vanes and shroud 66, and rotating the shrouded rotor back 68. Forming second stage S4 includes depositing material through the second stage of the hub 70, rotating the shrouded rotor 72, machining the second stage of the hub 74, depositing material through the second stage of the vanes and shroud 76, machining the second stage of the vanes and shroud 78, and rotating the shrouded rotor back 80. Forming Nth stage S6 includes depositing material through the Nth stage of the hub 82, rotating the shrouded rotor 84, machining the Nth stage of the hub 86, placing the inserts into the voids 88, depositing material through the Nth stage of the vanes and shroud 90, and removing the inserts 92. Hybrid additive manufacturing process 50 can additionally include the step of depositing material to create the labyrinth seal 94, which can be performed at a variety of times through hybrid additive manufacturing process 50.

Before forming first stage S2, an additive manufacturing system is provided that is configured to deposit material and machine surfaces to form shrouded rotor 10. Forming first stage S2 begins by depositing material to construct the first stage of the hub 58. The material is deposited to construct first stage S1 of hub 12 in axial build direction A by depositing material layer by layer in an additive manufacturing process building axially upon the prior layer. By depositing material in axial build direction A, all features of first stage S1 of hub 12 can be constructed, including bore 22, ribs 24, and outer surface 26 of hub 12.

Next, the first stage of the hub can be rotated 60 from axial build direction A to radial build direction R. The rotation of hub 12 is approximately ninety degrees so that hub 12 can be machined and material can be deposited layer by layer the same way as in step 58 but in radial build direction R.

Hybrid additive manufacturing process 50 does not need to include step 60 (rotating hub 12) if the additive manufacturing system is configured to deposit material in radial build direction R without the need to rotate hub 12.

Step 62 is machining outer surface 26 of first stage S1 of hub 12 to smooth outer surface 26. As mentioned above, outer surface 26 of first stage S1 of hubs 12 is machined to have a low surface roughness to provide less drag on the air flowing through flow path 18. This machining can be done by a buffer system or another configuration/machine designed to smooth outer surface 26.

After machining outer surface 26, material is deposited through the first stage of the vanes and shroud 64. Step 64 entails depositing material layer by layer in an additive manufacturing process to construct first stage S1 of vanes 14 and shroud 16. The material is deposited in radial build direction R (i.e., depositing layer by layer in a radially outward direction). First stage S1 of hub 12 and the soon-to-be and/or partially constructed vanes 14 and shroud 16 can be rotated circumferentially about centerline C as material is deposited to create first stage S1 of vanes 14 and shroud 16 during step 64 so that one entire radial layer of first stage S1 of vanes 14 and shroud 16 is completely constructed before beginning construction/deposition of the next radial layer radially outward from the prior radial layer (or the apparatus depositing material can rotate about centerline C to deposit material circumferentially). Thus, the entire radially inward layer is completed before beginning construction of a radially outward layer upon that radially inward layer. Alternatively, material can be deposited in another order to construct first stage S1 of vanes 14 and shroud 16.

After radial outer side 32 of first stage S1 of shroud 16 is constructed (with the rest of first stage S1 of vanes 14 and shroud 16 radially inward from radial outer side 32 also being constructed), the first stage of the surfaces of the vanes and the inner surface of the shroud is machined to smooth those flow surfaces 66. As mentioned above, surfaces 30 of first stage S1 of vanes 14 and inner surface 34 of first stage S1 of shroud 16 are machined to have a low surface roughness to provide less drag on the air flowing through flow path 18. As with the machining of outer surface 26 of hub 12, this machining can be done by a buffer system or another configuration/machine designed to smooth surfaces 30 of vanes 14 and inner surface 34 of shroud 16.

The final stage of forming the first stage of the shrouded rotor 52 includes step 68, which is rotating the newly created first stage S1 of shrouded rotor 10 (which includes first stage S1 of hub 12, vanes 14, and shroud 16) back to axial build direction A. The rotation places first stage S1 of shrouded rotor 10 in the orientation that the component was in prior to forming the first stage S2 and ensures the partial shrouded rotor 10 (i.e., first stage S1 of shrouded rotor 10) is properly oriented for the forming of the second stage of the shrouded rotor 54. The rotation of first stage S1 of shrouded rotor 10 back to axial build direction A is approximately ninety degrees so that second stage S2 of hub 12 can be deposited in axial build direction A. As with step 60, hybrid additive manufacturing process 50 does not need to include step 68 (rotating first stage S1 of shrouded rotor 10) if the additive manufacturing system is configured to deposit material in radial build direction R without the need to rotate shrouded rotor 10 (thus, there would be no need to rotate shrouded rotor 10 back).

After the first stage is formed 52, the second stage is formed 54 in a similar process except that the geometry of second stage S2 of hub 12, vanes 14, and shroud 16 is different than the geometry of those components of first stage S1.

Forming second stage S4 begins by depositing material to construct the second stage of hub 70. Different than step 58 (depositing material to construct first stage S1 of hub 12), however, is that the material is deposited on first stage S1 of hub 12 such that second stage S2 of hub 12 is built/constructed upon the already created first stage S1 of hub 12 to form a shrouded rotor 10 that is one continuous component. The material bonds to first stage S1 of hub 12 so that first stage S1 and second stage S2 of hub 12 is one continuous component. As with step 58, the material is deposited to construct second stage S2 of hub 12 in axial build direction A by depositing material layer by layer in an additive manufacturing process. Second stage S2 of hub 12 can have the same, different, or additional features than those of first stage S1 of hub 12. For example, second stage S2 of hub 12 can include a radial diameter that is larger than a radial diameter at any axial cross section of first stage S1 of hub 12 (i.e., forming hub 12 as a frustoconical shape). Additionally, second stage S2 of hub 12 can continue the construction of ribs 24 within hub 12.

The next steps of forming second stage S4 are identical to those of forming first stage S2, except that the geometry of second stage S2 of vanes 14 and shroud 16 (and hub 12) is different than the geometry of those components in first stage S1. After depositing material to construct the second stage of hub 70, the shrouded rotor (which includes first stage S1 of hub 12, vanes 14, and shroud 16 and also second stage S2 of hub 12) can be rotated 72. The rotation can be from axial build direction A to radial build direction R (approximately ninety degrees). Next, step 74 is machining second stage S2 of outer surface 26 of hub 12 to have a low surface roughness to provide less drag on the air flowing through flow path 18. After that, material is deposited through the second stage of the vanes and shroud 76. As with step 64 in the forming of the first stage S2, the material is deposited in radial build direction R layer by layer to form second stage S2 of vanes 14 and shroud 16. Next, the second stage of the surfaces of the vanes and the inner surface of the shroud is machined to smooth those flow surfaces 78. Surfaces 30 of second stage S2 of vanes 14 and inner surface 34 of second stage S2 of shroud 16 are machined to have a low surface roughness to provide less drag on the air flowing through flow path 18. Finally, the newly created second stage of the shrouded rotor and the previously created first stage of the shrouded rotor are rotated back 80 from radial build direction R to axial build direction A. The rotation of first stage S1 and second stage S2 of shrouded rotor 10 is approximately ninety degrees so that the next stage of hub 12 can be deposited in axial build direction A. As with steps 60, 68, and 72, hybrid manufacturing process 50 does not need to include step 80 (rotating first stage S1 and second stage S2 of shrouded rotor 10) if the additive manufacturing system is configured to deposit material in radial build direction R without the need to rotate shrouded rotor 10.

After forming the second stage of the shrouded rotor 54, third stage S3 through [N−1]th stage are performed in a similar process to forming second stage S2. As described above, the manufacture of shrouded rotor 10 can be divided into any number of stages necessary to allow access of a buffering/machining system to smooth the flow surfaces of shrouded rotor 10. With shrouded rotor 10 in FIG. 1B, the manufacture process includes three stages so third stage S1 would be the same as the Nth stage described below. However, if more stages were used, the process used to create the portion of shrouded rotor 10 constructed during each of those stages would be similar to the process utilized to construct the portion of shrouded rotor 10 formed during second stage S2. Thus, one of the last stages in hybrid additive manufacturing process 50 is the Nth stage as described below because inserts 44 are utilized during the Nth stage. However, other embodiments of hybrid additive manufacturing process 50 do not need to utilize inserts 42, so the Nth stage would the same as second stage S2 described above.

Forming the Nth stage of the shrouded rotor 56 is similar to forming the second stage of the shrouded rotor 54 except that forming the Nth stage S6 includes incorporating inserts 42 shown in FIG. 1C into the manufacturing process. Also, the geometry of second stage S2 of hub 12, vanes 14, and shroud 16 is different than the geometry of subsequent stages, including the Nth stage. As with forming second stage S4, forming Nth stage S6 begins by depositing material through the Nth stage of the hub 82 by depositing material to create the Nth stage of hub 12 upon the already created second stage S2 of hub 12 to form a shrouded rotor 10 that is one continuous component. Next, the shrouded rotor (which includes hub 12, vanes 14, and shroud 16 constructed by previous stages) can be rotated 84. The rotation can be from axial build direction A to radial build direction R (approximately ninety degrees). Next, step 86 is machining outer surface 26 of the Nth stage of hub 12 to have a low surface roughness to provide less drag on the air flowing through flow path 18.

After that, inserts are placed into the voids in the flow path 88. Inserts 42 are placed into voids 44 in flow path 18 to provide support to the soon-to-be-created Nth stage of vanes 14 and shroud 16 when support is necessary due to the Nth stage of shroud 16 having a large overhang that may not be able to be supported by vanes 14 until the Nth stage of shroud 16 hardens. Inserts 42 can have any shape and/or configuration able to fit within voids 44 in flow path 18 and then allow for removal of inserts 44 at the end of the forming of the Nth stage S6.

With inserts 42 in place within voids 44, material is deposited through the Nth stage of the vanes and shroud 90. As with step 78 in the forming of the second stage S4, the material is deposited in radial build direction R layer by layer to form the Nth stage of vanes 14 and shroud 16. However, with inserts 42 in place, the material forming the Nth stage of shroud 16 may also be deposited upon inserts 42 with inserts 42 providing support to the Nth stage of vanes 14 and shroud 16 until vanes 14 and shroud 16 cool and harden.

Next, the inserts are removed 92 after the Nth stage of vanes 14 and shroud 16 has hardened such that no support is needed. Inserts 42 are removed from voids 44 so that flow path 18 is unobstructed (aside from vanes 14, which function to guide air flowing through flow path 18). Inserts 42 can be removed through machining (i.e., inserts 42 are ground, buffed, drilled, or otherwise removed using a machine) or through chemical means (i.e., a chemical is used to dissolve inserts 42 while not dissolving the material used to construct shrouded rotor 10). After inserts 42 are removed, forming the Nth stage S6 can optionally include machining surface 30 of the Nth stage of vanes 14 and inner surface 34 of the Nth stage of shroud 16 to smooth those flow surfaces to have a low surface roughness to provide less drag on the air flowing through flow path 18. However, this step may not be needed if inserts 42 are constructed from a material that does not bond with the material used to contract shrouded rotor 10 so that when inserts 42 are removed, surface 30 of vane 14 and inner surface 34 of shroud 16 are already smooth. Additionally, the removal of the inserts (step 92) could also include machining surfaces 30 and inner surface 34.

If the Nth stage is not the final stage to be formed during hybrid additive manufacturing process 50, then forming the Nth stage S6 may include rotating the partially created shrouded rotor 10 back from radial build direction R to axial build direction A to prepare for the deposition of material to form the next stage of hub 12.

While shown as the final step in hybrid additive manufacturing process 50, depositing material to create the labyrinth seal 94 can be performed during or after the construction of the stage of shroud 16 upon which labyrinth seal 40 is located (or another time during hybrid additive manufacturing process 50). Material is deposited on radial outer side 32 of shroud 16 layer by layer in an additive manufacturing process to create labyrinth seal 40, and the process utilized to deposit material to create labyrinth seal 40 is similar to the process utilized to deposit material to create shroud 16. The material is deposited in radial build direction R and can be deposited such that labyrinth seal 40 is one continuous component with shrouded rotor 10. Shrouded rotor 10 can be rotated circumferentially about centerline C as material is deposited during step 94 so that one entire radial layer of labyrinth seal 50 is completely constructed before beginning construction/deposition of the next radial layer upon the prior radial layer (or the apparatus depositing material can rotate about centerline C to deposit material circumferentially). Alternatively, material can be deposited in another order to construct labyrinth seal 40. Once all material necessary to construct labyrinth seal 40 is deposited, labyrinth seal 40 can be machined and/or other components of labyrinth seal 40 not continuous with shrouded rotor 10 can be fastened to labyrinth seal 40.

As stated above, hybrid additive manufacturing process 50 manufactures shrouded rotor 10 in stages (first stage S1, second stage S2, third stage S3, the Nth stage described in subprocess 56, etc.) that allow for machining/smoothing tools to access the flow surfaces (outer surface 26 of hub 12, surfaces 30 of vanes 14, and inner surface 34 of shroud 16) adjacent flow path 18 within shrouded rotor 10. With hybrid additive manufacturing process 50 allowing for the flow surfaces to be machined/smoothed, the efficiency of the resulting shrouded rotor 10 is increased because of the smoothness of the flow surfaces. Because vanes 14 of shrouded rotor 10 are supported at both ends (i.e., supported at a radially inner end by hub 12 and at a radially outer end by shroud 16), vanes 14 can have a reduced thickness, which also increases efficiency by reducing the mass of shrouded rotor 10 and by requiring a less robust containment structure that is needed to prevent damage if/when vanes 14 become detached from hub 12. With shroud 16 being integral with vanes 14 and hub 12, the manufacturing process is simplified because a separate shroud does not need to be fastened to vanes 14 and hub 12 through welding or other means. Further, because shroud 16 in integral with vanes 14 and hub 12, vanes 14 and hub 12 do not need to be axially shimmed to adjust the clearance between rotating vanes 14 and hub 12 and the nonrotating shroud, thus further simplifying the manufacturing process.

Discussion of Possible Embodiments

The following are non-exclusive descriptions of possible embodiments of the present invention.

A hybrid additive manufacturing process is utilized for creating a shrouded rotor with the shrouded rotor having a hub at a radial center, a shroud at a radial outer side, and vanes extending therebetween. The hybrid additive manufacturing process includes forming the shrouded rotor in stages, with a first stage being formed by depositing material in an axial direction through a first stage of the hub, machining an outer surface of the first stage of the hub to smooth the outer surface, depositing material on the first stage of the hub in a radial direction through a first stage of the vanes and the shroud, and machining all surfaces of the first stage of the vanes and an inner surface of the first stage of the shroud to smooth the surfaces. A second stage of the shrouded rotor is formed by depositing material on the first stage of the hub in the axial direction through a second stage of the hub, machining an outer surface of the second stage of the hub to smooth the outer surface, depositing material on the second stage of the hub in the radial direction through a second stage of the vanes and the shroud, and machining all surfaces of the second stage of the vanes and an inner surface of the second stage of the shroud to smooth the surfaces. The hybrid manufacturing process can form the shrouded rotor through any number of stages similar to the process of forming the first stage and/or the second stage.

The method of the preceding paragraph can optionally include, additionally and/or alternatively, any one or more of the following features, configurations, steps, and/or additional components:

During the forming of the first stage of the shrouded rotor after depositing material in the axial direction through the first stage of the hub, rotating the first stage of the hub from an axial build direction to a radial build direction before machining the outer surface of the first stage of the hub.

During the forming of the first stage of the shrouded rotor after machining all surfaces of the first stage of the vanes and the inner surface of the first stage of the shroud, rotating the newly created first stage of the shrouded rotor back to the axial build direction.

During the forming of the first stage of the shrouded rotor and during the depositing of material on the first stage of the hub in the radial direction through the first stage of the vanes and the shroud, rotating the first stage of the hub in a circumferential direction as the material is being deposited to create the first stage of the vanes and the shroud.

Forming a third through Nth stage of the shrouded rotor using the same steps performed to form the second stage of the shrouded rotor.

During an Nth stage after machining an outer surface of the Nth stage of the hub, placing at least one insert into at least one void between a soon-to-be-created Nth stage of vanes to provide support to the soon-to-be-created Nth stage of vanes and a soon-to-be-created Nth stage of the shroud, depositing material in the radial direction though the Nth stage of the vanes and the Nth stage of the shroud, and removing the at least one insert.

The removal of the at least one insert is accomplished by machining the at least one insert.

The removal of the at least one insert is accomplished by using a chemical to dissolve the at least one insert.

The at least one insert is constructed from a different material than the material deposited to create the hub, vanes, and shroud.

The material that the at least one insert is constructed from does not bond to the material deposited to create the Nth stage of the hub, vanes, and shroud such that all surfaces of the Nth stage of the vanes and the inner surface of the Nth stage of the shroud adjacent to the at least one insert have a surface roughness of less than $32R_a$.

The shrouded rotor is one continuous component.

Depositing material on an outer surface of the shroud to create a labyrinth seal.

Depositing material in an axial direction through a first stage of the hub and depositing material through the second stage of the hub includes depositing material to create an internal structure of the hub.

The internal structure of the hub includes radially extending ribs.

The vanes are a thin wall supported at a radially inner end by the hub and at a radially outer end by the shroud.

The hub is a hollow frustoconical shape such that a first axial end of the hub formed during the forming of the first stage has a cross section with a smaller diameter than a diameter of a cross section of the hub formed during the forming of the second stage of the hub.

A shrouded rotor includes a hub at a radial center having an outer surface forming an inner wall of a flow path, a shroud at a radial outer side having an inner surface forming an outer wall of the flow path, and vanes extending within the flow path between the hub and the shroud with the outer surface of the hub, the inner surface of the shroud, and all surfaces of the vanes having a surface roughness average of less than $32R_a$.

The shrouded rotor of the preceding paragraph can optionally include, additionally and/or alternatively, any one or more of the following features, configurations, steps, and/or additional components:

A diameter of the hub at a first axial end is less than a diameter of the hub at a second axial end.

The hub includes a bore at the radial center configured to allow a shaft to extend through.

A labyrinth seal that is on an outer surface of the shroud.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hybrid additive manufacturing method for creating a shrouded rotor having a hub at a radial center, a shroud at a radial outer side, and vanes extending therebetween, the method comprising:
    forming a first stage of the shrouded rotor comprising:
        depositing material in an axial direction through a first stage of the hub;
        machining an outer surface of the first stage of the hub to smooth the outer surface;
        depositing material on the first stage of the hub in a radial direction through a first stage of the vanes and the shroud; and
        machining all surfaces of the first stage of the vanes and an inner surface of the first stage of the shroud to smooth the surfaces;
    forming a second stage of the shrouded rotor comprising:
        depositing material on the first stage of the hub in the axial direction through a second stage of the hub;
        machining an outer surface of the second stage of the hub to smooth the outer surface;

depositing material on the second stage of the hub in the radial direction through a second stage of the vanes and the shroud; and machining all surfaces of the second stage of the vanes and an inner surface of the second stage of the shroud to smooth the surfaces.

2. The method of claim 1, further comprising:
during the forming of the first stage of the shrouded rotor after depositing material in the axial direction through the first stage of the hub, rotating the first stage of the hub from an axial build direction to a radial build direction before machining the outer surface of the first stage of the hub.

3. The method of claim 2, further comprising:
during the forming of the first stage of the shrouded rotor after machining all surfaces of the first stage of the vanes and the inner surface of the first stage of the shroud, rotating the newly created first stage of the shrouded rotor back to the axial build direction.

4. The method of claim 1, further comprising:
during the forming of the first stage of the shrouded rotor and during the depositing of material on the first stage of the hub in the radial direction through the first stage of the vanes and the shroud, rotating the first stage of the hub in a circumferential direction as the material is being deposited to create the first stage of the vanes and the shroud.

5. The method of claim 1, further comprising:
forming a third through Nth stage of the shrouded rotor using the same steps performed to form the second stage of the shrouded rotor.

6. The method of claim 5, further comprising:
During the Nth stage after machining an outer surface of the Nth stage of the hub, placing at least one insert into at least one void between a soon-to-be-created Nth stage of vanes to provide support to the soon-to-be-created Nth stage of vanes and a soon-to-be-created Nth stage of the shroud;
depositing material in the radial direction though the Nth stage of the vanes and the Nth stage of the shroud; and
removing the at least one insert.

7. The method of claim 6, wherein removing the at least one insert is accomplished by machining the at least one insert.

8. The method of claim 6, wherein removing the at least one insert is accomplished by using a chemical to dissolve the at least one insert.

9. The method of claim 6, wherein the at least one insert is constructed from a different material than the material deposited to create the hub, vanes, and shroud.

10. The method of claim 6, wherein the material that the at least one insert is constructed from does not bond to the material deposited to create the Nth stage of the hub, vanes, and shroud such that all surfaces of the Nth stage of the vanes and the inner surface of the Nth stage of the shroud adjacent to the at least one insert have a surface roughness average of less than $32R_a$.

11. The method of claim 1, wherein the shrouded rotor is one continuous component.

12. The method of claim 1, further comprising:
depositing material on an outer surface of the shroud to create a labyrinth seal.

13. The method of claim 1, wherein depositing material in an axial direction through a first stage of the hub and depositing material through the second stage of the hub includes depositing material to create an internal structure of the hub.

14. The method of claim 13, wherein the internal structure of the hub includes radially extending ribs.

15. The method of claim 1, wherein the vanes are a thin wall supported at a radially inner end by the hub and at a radially outer end by the shroud.

16. The method of claim 1, wherein the hub is a hollow frustoconical shape such that a first axial end of the hub formed during the forming of the first stage has a cross section with a smaller diameter than a diameter of a cross section of the hub formed during the forming of the second stage of the hub.

* * * * *

UNITED STATES PATENT AND TRADEMARK OFFICE
CERTIFICATE OF CORRECTION

PATENT NO.         : 10,710,160 B2
APPLICATION NO.    : 15/864599
DATED              : July 14, 2020
INVENTOR(S)        : Donald E. Army, Diana Giulietti and Alexander Madinger It is certified that error appears in the above-identified patent and that said Letters Patent is hereby corrected as shown below:

In the Specification

Column 3, Line 36:
Delete "S1"
Insert --51--

Column 3, Line 36:
Delete "S2"
Insert --52--

Column 3, Line 37:
Delete "S3"
Insert --53--

Column 3, Line 37:
Delete "S1"
Insert --51--

Column 3, Line 37:
Delete "S2"
Insert --52--

Column 3, Line 38:
Delete "S3"
Insert --53--

Column 4, Line 25:
Delete "S2"
Insert --52--

Signed and Sealed this
Eleventh Day of August, 2020

Andrei Iancu
*Director of the United States Patent and Trademark Office*

Column 5, Line 60:
Delete "S1"
Insert --51--

Column 5, Line 60:
Delete "S2"
Insert --52--

Column 5, Line 60:
Delete "S3"
Insert --53--

Column 5, Line 66:
Delete "S2"
Insert --52--

Column 6, Line 2:
Delete "S2"
Insert --52--

Column 6, Line 4:
Delete "S1"
Insert --51--

Column 6, Line 4:
Delete "S2"
Insert --52--

Column 6, Line 5:
Delete "S3"
Insert --53--

Column 6, Line 8:
Delete "S1"
Insert --51--

Column 6, Line 10:
Delete "S2"
Insert --52--

Column 6, Line 11:
Delete "S1"
Insert --52--

CERTIFICATE OF CORRECTION (continued)
U.S. Pat. No. 10,710,160 B2

Column 6, Line 13:
Delete "S3"
Insert --53--

Column 6, Line 28:
Delete "S2"
Insert --52--

Column 6, Line 29:
Delete "S4"
Insert --54--

Column 6, Line 29:
Delete "S6"
Insert --56--

Column 6, Line 30:
Delete "S3"
Insert --53--

Column 6, Line 32:
Delete "S2"
Insert --52--

Column 6, Line 37:
Delete "S4"
Insert --54--

Column 6, Line 52:
Delete "S2"
Insert --52--

Column 6, Line 55:
Delete "S2"
Insert --52--

Column 6, Line 57:
Delete "S1"
Insert --51--

Column 6, Line 61:
Delete "S1"
Insert --51--

Column 7, Line 7:
Delete "S1"
Insert --51--

Column 7, Line 16:
Delete "S1"
Insert --51--

Column 7, Line 19:
Delete "S1"
Insert --51--

Column 7, Line 22:
Delete "S1"
Insert --51--

Column 7, Line 24:
Delete "S1"
Insert --51--

Column 7, Line 40:
Delete "S1"
Insert --51--

Column 7, Line 41:
Delete "S1"
Insert --51--

Column 7, Line 51:
Delete "S1"
Insert --51--

Column 7, Line 53:
Delete "S2"
Insert --52--

Column 7, Line 56:
Delete "S1"
Insert --51--

Column 7, Line 58:
Delete "S2"
Insert --52--

Column 8, Line 1:
Delete "S2"
Insert --52--

Column 8, Line 3:
Delete "S1"
Insert --51--

Column 8, Line 4:
Delete "S4"
Insert --54--

Column 8, Line 6:
Delete "S1"
Insert --51--

Column 8, Line 8:
Delete "S2"
Insert --52--

Column 8, Line 11:
Delete "S1"
Insert --51--

Column 8, Line 12:
Delete "S1"
Insert --51--

Column 8, Line 12:
Delete "S2"
Insert --52--

Column 8, Line 14:
Delete "S2"
Insert --52--

Column 8, Line 16:
Delete "S2"
Insert --52--

Column 8, Line 17:
Delete "S1"
Insert --51--

Column 8, Line 18:
Delete "S1"
Insert --51--

Column 8, Line 19:
Delete "S2"
Insert --52--

Column 8, Line 22:
Delete "S2"
Insert --52--

Column 8, Line 24:
Delete "S4"
Insert --54--

Column 8, Line 25:
Delete "S2"
Insert --52--

Column 8, Line 26:
Delete "S2"
Insert --52--

Column 8, Line 28:
Delete "S1"
Insert --51--

Column 8, Line 30:
Delete "S1"
Insert --51--

Column 8, Line 31:
Delete "S2"
Insert --52--

Column 8, Line 34:
Delete "S2"
Insert --52--

Column 8, Line 38:
Delete "S2"
Insert --52--

Column 8, Line 40:
Delete "S2"
Insert --52--

Column 8, Line 43:
Delete "S2"
Insert --52--

Column 8, Line 44:
Delete "S2"
Insert --52--

Column 8, Line 50:
Delete "S1"
Insert --51--

Column 8, Line 50:
Delete "S2"
Insert --52--

Column 8, Line 54:
Delete "S1"
Insert --51--

Column 8, Line 55:
Delete "S2"
Insert --52--

Column 8, Line 59:
Delete "S3"
Insert --53--

Column 8, Line 60:
Delete "S2"
Insert --52--

Column 9, Line 4:
Delete "S2"
Insert --52--

Column 9, Line 9:
Delete "S2"
Insert --52--

Column 9, Line 15:
Delete "S2"
Insert --52--

Column 9, Line 18:
Delete "S4"
Insert --54--

Column 9, Line 18:
Delete "S6"
Insert --56--

Column 9, Line 21:
Delete "S2"
Insert --52--

Column 9, Line 39:
Delete "S6"
Insert --56--

Column 9, Line 42:
Delete "S4"
Insert --54--

Column 9, Line 60:
Delete "S6"
Insert --56--

Column 10, Line 6:
Delete "S6"
Insert --56--

Column 10, Line 6:
Delete "S6"
Insert --56--

Column 10, Line 36:
Delete "S1"
Insert --51--

Column 10, Line 37:
Delete "S2"
Insert --52--

Column 10, Line 37:
Delete "S3"
Insert --53--